US012798948B2

(12) United States Patent
Kokura

(10) Patent No.: US 12,798,948 B2
(45) Date of Patent: Nov. 17, 2026

(54) SAFETY DEVICE AND PICKING LIFT PROVIDED WITH SAME

(71) Applicant: Mitsubishi Logisnext Co., Ltd., Kyoto (JP)

(72) Inventor: Kazumasa Kokura, Kyoto (JP)

(73) Assignee: Mitsubishi Logisnext Co., Ltd., Kyoto (JP)

( * ) Notice: Subject to any disclaimer, the term of this patent is extended or adjusted under 35 U.S.C. 154(b) by 270 days.

(21) Appl. No.: 18/772,249

(22) Filed: Jul. 14, 2024

(65) Prior Publication Data

US 2025/0236501 A1 Jul. 24, 2025

(30) Foreign Application Priority Data

Jan. 22, 2024 (JP) ................................ 2024-007157

(51) Int. Cl.
*B66F 17/00* (2006.01)
*A62B 35/00* (2006.01)
*B66F 9/075* (2006.01)

(52) U.S. Cl.
CPC ............ *B66F 17/003* (2013.01); *A62B 35/00* (2013.01); *B66F 9/0759* (2013.01)

(58) Field of Classification Search
CPC ....... B66F 17/003; B66F 9/0759; A62B 35/00
See application file for complete search history.

(56) References Cited

U.S. PATENT DOCUMENTS 11,819,714 B2 11/2023 Carlson et al.
2023/0316758 A1* 10/2023 Molinek ................ G06V 20/52 348/143
2024/0024712 A1* 1/2024 Prevot ................ A62B 35/0093

FOREIGN PATENT DOCUMENTS

CN 113119906 A * 7/2021 ............ B60R 22/48
JP 2014144865 A * 8/2014
JP 2015224114 12/2015
JP 2022015048 1/2022

OTHER PUBLICATIONS

"Search Report of Europe Counterpart Application", issued on Jan. 28, 2025, p. 1-p. 4.

* cited by examiner

*Primary Examiner* — Michael W Choi
(74) *Attorney, Agent, or Firm* — JCIPRNET

(57) ABSTRACT

A safety device, includes: a belt, configured to be worn by the operator; an image capture part, capturing an image of the driver's cab; and a wearing determination part, determining whether the operator is wearing the belt; the wearing determination part includes: a collection part, collecting an image of a state of the operator and the belt; a learning model generation part, generating and storing a learning model through machine learning; an acquisition part, acquiring an image of a state of the operator and the belt at a current time point by the image capture part; a prediction part, predicting a state of the operator and the belt by inputting the image at the current time point acquired from the acquisition part into the learning model generated in the learning model generation part; and a decision part, determining whether to warn the operator based on the prediction part.

2 Claims, 6 Drawing Sheets

SAFETY DEVICE AND PICKING LIFT PROVIDED WITH SAME

CROSS-REFERENCE TO RELATED APPLICATION

This application claims the priority benefits of Japanese application no. 2024-007157, filed on Jan. 22, 2024. The entirety of the above-mentioned patent application is hereby incorporated by reference herein and made a part of this specification.

TECHNICAL FIELD

The disclosure relates to a safety device that prevents an operator in a driver's cab of a picking lift from falling from the driver's cab, and to a picking lift provided with the same.

RELATED ART

A picking lift includes a driver's cab that may be lifted and lowered along a mast and a pair of left and right forks that protrude rearward from the driver's cab. For cargo handling using a picking lift, a pallet is inserted into the fork, and the driver's cab carrying the operator moves to a high position so that the operator may load and unload baggage between the shelf and the pallet.

For example, as shown in Patent Document 1 (Japanese Patent Application Laid-Open (JP-A) No. 2015-224114), the picking lift is designed to prevent the operator from falling from the driver's cab onto the floor, and the picking lift is provided with a safety device having a belt to be worn by the operator and a connecting part connecting the belt and the picking lift.

Operators may find it troublesome to wear a belt or dislike being restrained, and therefore may perform cargo handling in a high driver's cab without wearing a belt around their body. Due to the highly hazardous nature of these operations, Patent Document 1 includes a safety device provided with an wearing determination part that determines whether the operator is wearing the belt, and based on the determination results from the wearing determination part, the operator is warned to wear the belt, thereby preventing fall accidents of the operator.

The wearing determination part of the safety device uses an image reader to detect a mark on the belt and determine whether the operator is wearing the belt. However, depending on the position of the belt being worn by the operator, there is a problem that the image reader may have difficulty detecting the mark or may make an erroneous detection.

SUMMARY

A safety device of the disclosure, which is configured to prevent an operator in a driver's cab of a picking lift from falling, includes: a belt, configured to be worn by the operator; an image capture part, capturing an image of the driver's cab; and a wearing determination part, determining whether the operator is wearing the belt, the wearing determination part includes: a collection part, collecting an image of a state of the operator and the belt; a learning model generation part, generating and storing a learning model through machine learning; an acquisition part, acquiring an image of a state of the operator and the belt at a current time point by the image capture part; a prediction part, predicting a state of the operator and the belt by inputting the image at the current time point acquired from the acquisition part into the learning model generated in the learning model generation part; and a decision part, determining whether to warn the operator based on the prediction part.

DESCRIPTION OF EMBODIMENTS

The disclosure provides a safety device and a picking lift provided with the same that are capable of more accurately determining the state of the operator and the belt, such as whether the operator is wearing the belt.

Preferably, the state of the operator and the belt includes a state in which the operator is in the process of wearing the belt.

Further, the picking lift according to the disclosure includes the above-mentioned safety device; a warning part, configured to warn the operator to wear the belt; and a vehicle control part, controlling the warning part.

Preferably, the vehicle control part operates the warning part when the wearing determination part determines that the operator is not wearing the belt, then, operates the warning part until a predetermined set time has elapsed when the wearing determination part determines that the operator is in a process of wearing the belt, and stops the warning part and controls the picking lift to be inoperable when the set time has elapsed.

The safety device according to the disclosure and the picking lift provided with the same are capable of more accurately determining whether the operator is wearing the belt.

Hereinafter, one embodiment of a safety device and a picking lift provided with the same according to the disclosure are described with reference to the drawings.

Figure 1:
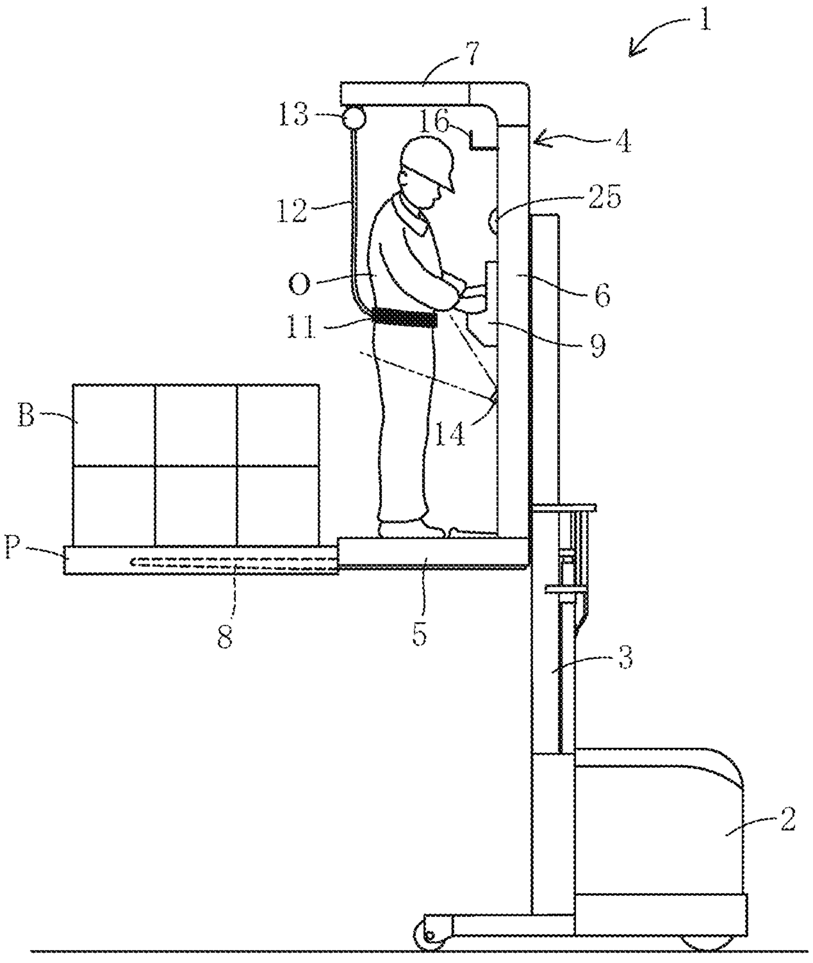
FIG. 1 is a side view showing the picking lift provided with the safety device according to the disclosure.
Figure 2:
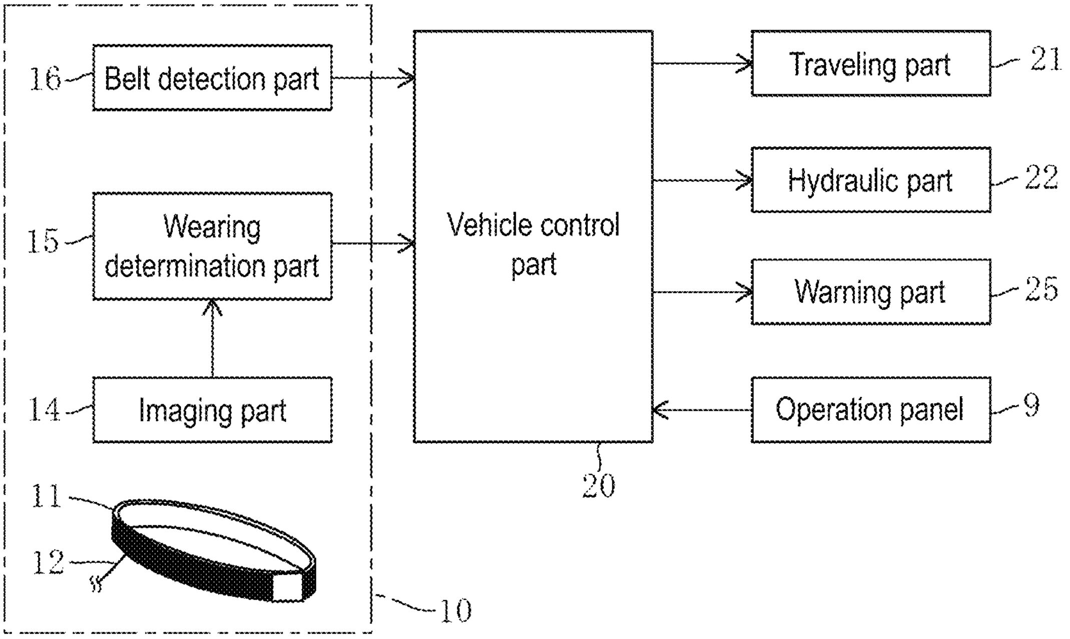
FIG. 2 is a block diagram showing the configuration of the picking lift.

As shown in FIG. 1 and FIG. 2, the picking lift 1 includes a vehicle main body part 2 housing a traveling part 21 and a hydraulic part 22, etc., a mast 3 erected at the rear of the vehicle main body part 2, a driver's cab 4 that is lifted and lowered along the mast 3, and a pair of left and right forks 8 protruding rearward from the driver's cab 4. The traveling part 21 includes a traveling motor for rotating the wheels, a turning motor for turning the wheels, and the like. The hydraulic part 22 includes a hydraulic tank and a hydraulic pump for lifting and lowering the driver's cab 4.

The driver's cab 4 has a floor frame 5, a front frame 6, a head guard 7, and an operation panel 9 provided in the front frame 6. The operation panel 9 is provided with a key switch for starting the picking lift 1, as well as handles and levers for providing instructions for driving the picking lift 1 and lifting and lowering the driver's cab 4.

The picking lift 1 includes a safety device 10, which includes a belt 11, a connecting part 12, and a winding part 13. The belt 11 is worn around the waist of the operator O who is in the driver's cab 4. The connecting part 12 has one end mounted to the belt 11 and the other end mounted to the winding part 13.

In addition, the winding part 13 is fixed to the head guard 7 of the driver's cab 4. A portion of up to 1 m from one end of the connecting part 12 is always pulled out from the winding part 13, and when tension is applied, the remaining portion is pulled out in accordance with the tension. When a large tension is applied to the connecting part 12, the winding part 13 prevents the connecting part 12 from being pulled out. As a result, even when the operator O falls from the high driver's cab 4, the operator O is suspended near the driver's cab 4 and does not collide with the floor.

For cargo handling using the picking lift 1, a pallet P is inserted into the forks 8, and the driver's cab 4 carrying the operator O moves to a high position so that the operator O may perform cargo handling of loading and unloading a baggage B at a high position between the shelf and the pallet P.

The safety device 10 includes an image capture part 14 including a CCD camera or the like. The image capture part 14 is provided below the operation panel 9 and is oriented so as to capture the lower half of the body of the operator O in the driver's cab 4, and is capable of determining the state of the operator O and the belt 11. The image capture part 14 acquires image data at a predetermined interval, such as 30 frames per second.

The safety device 10 includes a belt detection part 16. The belt detection part 16 includes an engaging part such as a hook provided on an upper part of the front frame 6 of the driver's cab 4 so as to be capable of holding the belt 11. Further, the belt detection part 16 includes a weight sensor, a vibration sensor, etc., at the engaging part such as a hook, and is capable of detecting the belt 11 held at the locking part. When the operator O removes the belt 11 from his/her body and hooks the belt 11 on the belt detection part 16, the belt detection part 16 detects the belt 11 and is capable of detecting that the belt 11 is not being worn by the operator O.

The safety device 10 also includes a wearing determination part 15. The wearing determination part 15 includes a microprocessor (MPU) and is configured to determine the state of the operator O and the belt 11, such as whether the belt 11 is being worn by the operator O, and to determine control of the picking lift 1, such as whether to warn the operator O, based on the image captured by the image capture part 14.

The picking lift 1 includes a warning part 25. The warning part 25 is configured to warn the operator O to wear the belt 11 when the belt 11 is not being worn by the operator O. The warning part 25 is configured by a lamp, a buzzer, or the like provided in the front frame 6 of the driver's cab 4, and warns the operator O to wear the belt 11 by lighting up or sounding.

The picking lift 1 includes a vehicle control part 20. The vehicle control part 20 may include a microprocessor (MPU) and may be integrally configured with the wearing determination part 15. The vehicle control part 20 is configured to control the traveling part 21, the hydraulic part 22, and the warning part 25 based on instructions from the operator O via the operation panel 9, the detection result of the belt detection part 16, and the determination result of the wearing determination part 15.

Figure 3A:
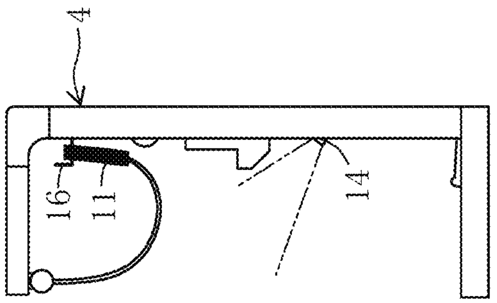
FIG. 3A to FIG. 3C are side views showing the first to third states of the operator and the belt.

As shown in FIG. 3A to FIG. 3C and FIG. 4A to FIG. 4B, the state of the operator O and the belt 11 may include the following five states:

(1) As shown in FIG. 3A, a state in which the operator O is not in the driver's cab 4 and the belt 11 is held in the belt detection part 16 is defined as a "first state."

Figure 3B:
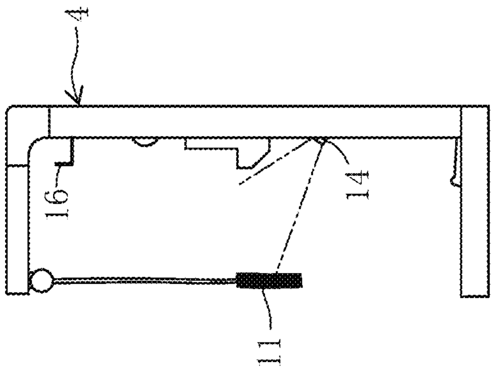

(2) As shown in FIG. 3B, a state in which the operator O is not in the driver's cab 4 and the belt 11 is not held in the belt detection part 16 is defined as a "second state."

Figure 3C:
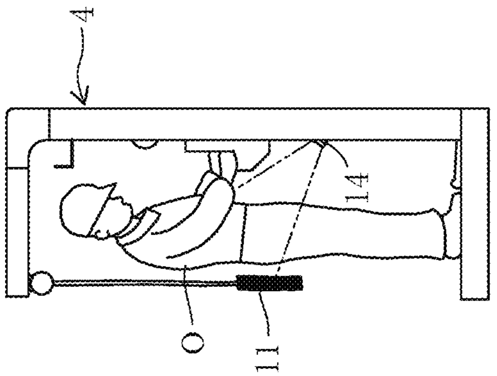

(3) As shown in FIG. 3C, a state in which the operator O is in the driver's cab 4 and the belt 11 is not being worn by the operator O is defined as a "third state."

Figure 4B:
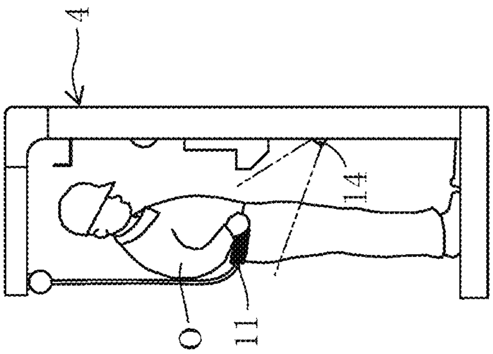
FIG. 4A and FIG. 4B are side views showing the fourth and fifth states of the operator and the belt.
Figure 4A:
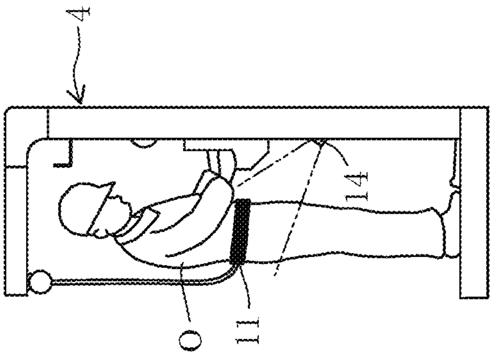

(4) As shown in FIG. 4A, a state in which the operator O is in the driver's cab 4 and the belt 11 is being worn by the operator O is defined as a "fourth state."

(5) As shown in FIG. 4B, a state in which the operator O is in the driver's cab 4 and the belt 11 is in the process of being worn by the operator O is defined as a "fifth state."

Figure 5:
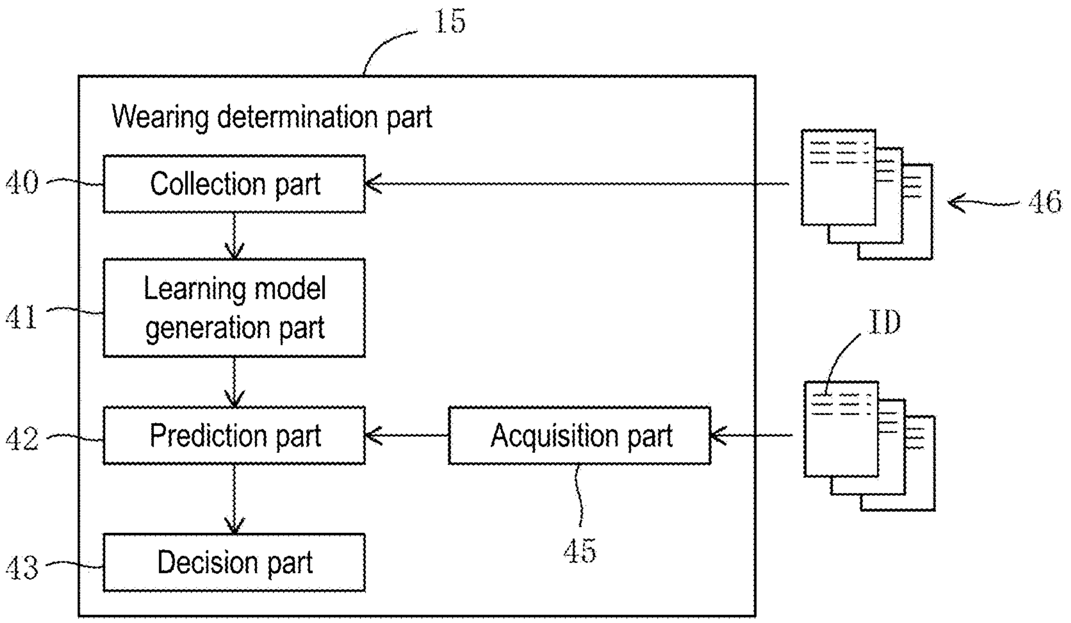
FIG. 5 is a block diagram showing the wearing determination part.

As shown in FIG. 5, the wearing determination part 15 includes a collection part 40 that collects features of the images of the states of the operator O and the belt 11 (first to fifth states) as input data for the training data 46. The features are extracted from the images in a general manner by quantifying the features of the target in the image.

The wearing determination part 15 includes a learning model generation part 41 that performs machine learning from the training data 46 collected in the collection part 40 and generates and stores a learning model through machine learning. In this embodiment, the learning model generation part 41 performs supervised learning using the training data 46 that associates the states of the operator O and the belt 11 (first to fifth states) with the features of the images. The learning model uses the training data 46 generated by the learning model generation part 41 to output the states of the operator O and the belt 11 (first to fifth states) according to the features of the images as output data.

The learning model generation part 41 uses a machine learning algorithm such as a general neural network. The learning model generation part 41 generates a learning model that estimates an output from an input, that is, a learning model that outputs output data when input data is input.

The wearing determination part 15 includes an acquisition part 45 that acquires, at predetermined time intervals, input data ID that is a feature based on an image at a current time point captured by the image capture part 14.

The wearing determination part 15 includes an prediction part 42 that predicts the states of the operator O and the belt 11 (first to fifth states) as output data OD by applying the learning model generated by the learning model generation part 41 to the input data ID at the current time point acquired by the acquisition part 45.

The wearing determination part 15 includes a decision part 43. The decision part 43 recognizes the states of the operator O and the belt 11 (first to fifth states) at the current time point based on the output data OD predicted by the prediction part 42 and makes a decision to warn the operator O to wear the belt 11. The vehicle control part 20 is configured to control the warning part 25 and the like based on the decision of the decision part 43.

Figure 6:
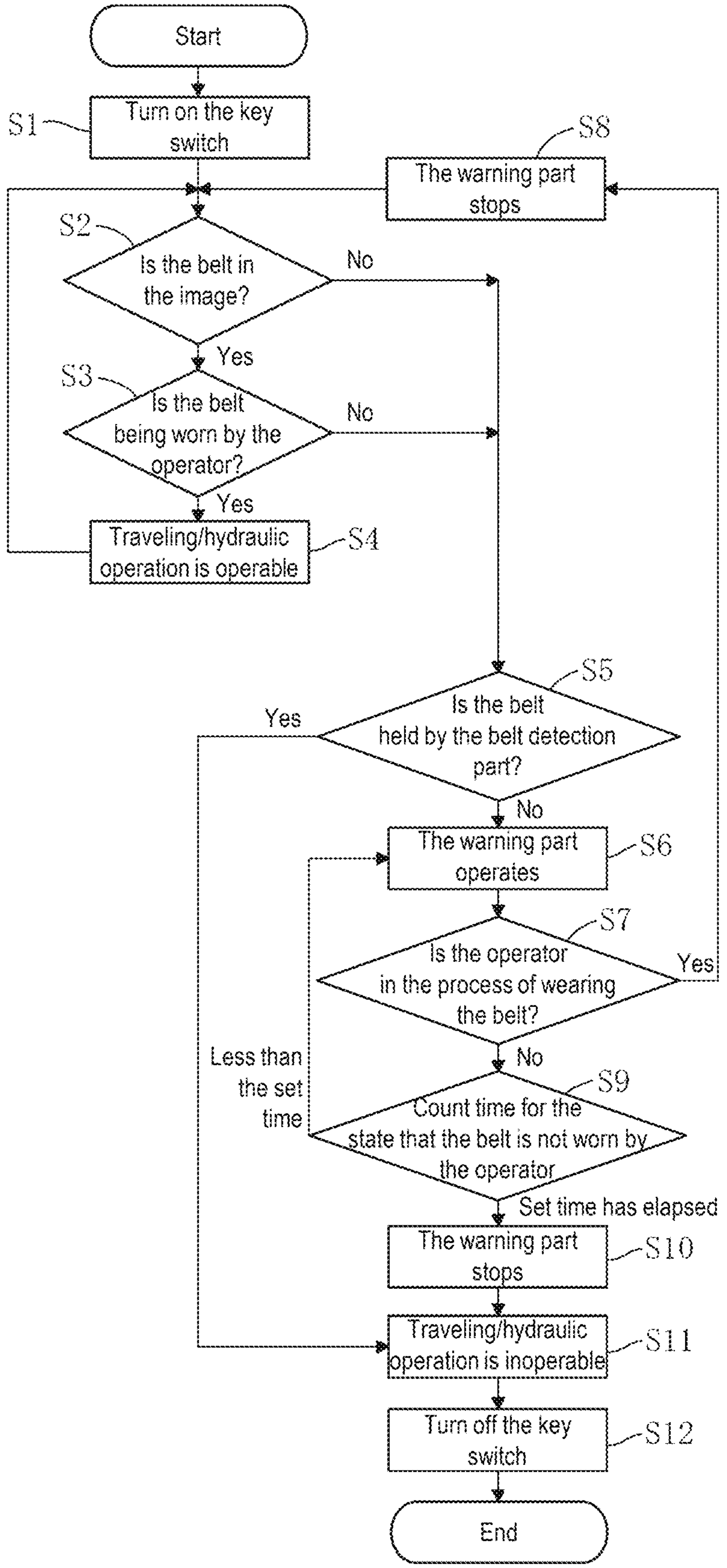
FIG. 6 is a flowchart showing the control method of the safety device.

As shown in FIG. 6, the picking lift 1 provided with the safety device 10 executes the following control.

An operator O turns on a key switch to activate the picking lift 1 (step S1). Then, the image capture part 14 captures an image of the driver's cab 4, and the wearing determination part obtains the image captured by the image capture part 14 at predetermined intervals.

The wearing determination part 15 determines whether the belt 11 is shown in the image captured by the image capture part 14 (step S2). When the belt 11 is shown in the image, the wearing determination part 15 determines whether the belt 11 is being worn by the operator O (step S3). Then, in the fourth state (FIG. 4A) in which the belt 11 is worn by the operator O, the vehicle control part 20 controls so that the traveling part 21 and the hydraulic part 22 are operable (step S4).

When it is determined that the belt 11 is not shown in the image (step S2), or that the belt 11 is shown in the image but the belt 11 is not being worn by the operator O (step S3), the wearing determination part 15 determines whether the belt 11 is held by the belt detection part 16 (step S5).

It is determined whether the belt detection part 16 is holding the belt 11 (step S5), and in the first state in which the belt 11 is held by the belt detection part 16 in (FIG. 3A), the traveling part 21 and the hydraulic part 22 are controlled so as to be inoperable (step S11).

Also, it is determined whether the belt detection part 16 is holding the belt 11 (step S5), and in the second state (FIG. 3B), the third state (FIG. 3C), or the fifth state (FIG. 4B) in which the belt 11 is not held by the belt detection part 16, the vehicle control part 20 controls the warning part 25 to operate (step S6).

After the warning part 25 operates, the wearing determination part 15 determines whether the belt 11 is in the fifth state (FIG. 4B) in which the belt 11 is in the process of being worn by the operator O (step S7). When the wearing determination part 15 determines that the belt 11 is in the fifth state (FIG. 4B) in which the belt 11 is in the process of being worn by the operator O, the vehicle control part 20 controls the warning part 25 to stop (step S8).

Further, when the wearing determination part 15 determines that the belt 11 is in the third state (FIG. 3C) in which the belt 11 is not in the process of being worn by the operator O (step S7), the vehicle control part 20 starts counting time for the state (step S9) and returns to step S6, where the operation of the warning part 25 continues. When the counted time is less than the predetermined set time, the operations of steps S6, S7, and S9 are repeated.

Then, when the counted time has passed a predetermined set time (step S9), the vehicle control part 20 stops the operation of the warning part 25 (step S10) and performs control so as to disable the traveling part 21 and the hydraulic part 22 and turn off the key switch (step S12). In this way, the operator O is unable to operate the picking lift 1.

Although the preferred embodiments of the disclosure have been described above, the configuration of the disclosure is not limited to these embodiments. For example, it may be modified as follows.

The wearing determination part 15 need only be capable of determining whether the belt 11 is not being worn by the operator O or whether the belt 11 is worn by the operator O, without determining only whether the belt 11 falls into the first to fifth states.

Further, the wearing determination part 15 may determine whether the belt 11 is held by an engaging part such as a hook based on the image captured by the image capture part 14, without determining whether the belt detection part 16 is holding the belt 11.

Then, the wearing determination part 15 may be configured to map the first to fifth states separately using supervised learning such as the above-mentioned embodiment, as well as unsupervised learning and semi-supervised learning.

Furthermore, the warning part 25 may be configured to display a warning mark or the like on the display part of the operation panel 9 in addition to the lamp or buzzer as in the above-mentioned embodiment.

The effects of the disclosure are described below.

The safety device 10 according to the disclosure is configured to prevent an operator O in a driver's cab 4 of a picking lift 1 from falling, including: a belt 11, configured to be worn by the operator O; an image capture part 14, capturing an image of the driver's cab 4; and a wearing determination part 15, determining whether the operator O is wearing the belt 11; the wearing determination part 15 including: a collection part 40, collecting an image of a state of the operator O and the belt 11; a learning model generation part 41, generating and storing a learning model through machine learning; an acquisition part 45, acquiring an image of a state of the operator O and the belt 11 at a current time point by the image capture part 14; a prediction part 42, predicting a state of the operator O and the belt 11 by inputting the image at the current time point acquired from the acquisition part 45 into the learning model generated in the learning model generation part 41; and a decision part 43, determining whether to warn the operator O based on the prediction part 42.

In this way, the wearing determination part 15 of the safety device 10 predicts the states of the operator O and the belt 11 based on the image captured by the image capture part 14 and the learning model, so that the state of the operator O and the belt 11 may be determined more accurately, such as whether the operator O is wearing the belt 11, regardless of the position of the belt 11 worn by the operator O.

Preferably, the state of the operator O and the belt 11 includes a state in which the operator O is in the process of wearing the belt 11.

In this way, when the wearing determination part 15 determines that the operator O is in the process of wearing the belt 11, although the belt 11 is not being worn by the operator O, since the operator O is about to wear the belt 11, the operation of the picking lift 1 may be more appropriately performed based on this state.

The picking lift 1 according to the disclosure includes the above-mentioned safety device 10, a warning part 25 that warns the operator O to wear the belt 11, and a vehicle control part 20 that controls the warning part 25.

In this way, the wearing determination part 15 of the safety device 10 determines the states of the operator O and the belt 11, so that the state of the operator O and the belt 11 may be determined more accurately regardless of the position of the belt 11 worn by the operator O. Thus, based on this determination result, the warning part 25 may appropriately warn the operator O to wear the belt 11.

Preferably, the vehicle control part 20 operates the warning part 25 when the wearing determination part 15 determines that the operator O is not wearing the belt 11, then, operates the warning part 25 until a predetermined set time has elapsed when the wearing determination part determines that the operator O is in a process of wearing the belt 11, and stops the warning part and controls the picking lift 1 to be inoperable when the set time has elapsed.

As a result, when the wearing determination part 15 determines that the belt 11 is not being worn by the operator O, it is possible to appropriately warn the operator O to wear the belt 11, and when the wearing determination part 15 determines that the operator O is in the process of wearing the belt 11, since the operator O is about to wear the belt 11, the warning by the warning part 25 is stopped so as not to interfere with the action of the operator O wearing the belt 11. Then, the vehicle control part 20 counts the time that the operator O is in the process of wearing the belt 11, and when the set time has elapsed, since it is determined that the operator O is unable to wear the belt 11, the operation of the picking lift 1 is disabled, thereby preventing the operator O from falling.

What is claimed is:

1. A picking lift, comprising:

a safety device, configured to prevent an operator in a driver's cab of the picking lift from falling, the safety device comprising:

a belt, configured to be worn by the operator;

an image capturing camera, configured to capture an image of the driver's cab;

a wearing determination processor, configured to determine whether the operator is wearing the belt by executing steps of:

collecting an image of a state of the operator and the belt;

generating and storing a learning model through machine learning;

acquiring the image of the state of the operator and the belt at a current time point by the image capturing camera;

predicting the state of the operator and the belt by inputting the acquired image at the current time point into the generated learning model; and determining whether to warn the operator based on the prediction of the state of the operator and the belt;

a warning device, provided in a vertical frame of the picking lift and configured to warn the operator to wear the belt; and a vehicle controller, configured to control the warning device, wherein the vehicle controller operates the warning device when the wearing determination processor determines that the operator is not wearing the belt, then, operates the warning device until a predetermined set time has elapsed when the wearing determination processor determines that the operator is in a process of wearing the belt, and stops the warning device and controls the picking lift to be inoperable when the predetermined set time has elapsed.

2. The picking lift according to claim 1, wherein the state of the operator and the belt comprises a state in which the operator is in a process of wearing the belt.

* * * * *